US 7,983,966 B2

(12) United States Patent
Ostlund (10) Patent No.: US 7,983,966 B2
(45) Date of Patent: Jul. 19, 2011

(54) SYSTEM FOR HANDLING REFUNDING OF VALUE-ADDED TAX

(75) Inventor: Markus Ostlund, Gothenburg (SE)

(73) Assignee: Global Blue Holdings AB (SE)

( * ) Notice: Subject to any disclaimer, the term of this patent is extended or adjusted under 35 U.S.C. 154(b) by 799 days.

(21) Appl. No.: 10/547,310

(22) PCT Filed: Mar. 10, 2004

(86) PCT No.: PCT/SE2004/000349
§ 371 (c)(1),
(2), (4) Date: Aug. 30, 2005

(87) PCT Pub. No.: WO2004/081838
PCT Pub. Date: Sep. 23, 2004

(65) Prior Publication Data
US 2006/0167705 A1    Jul. 27, 2006

(30) Foreign Application Priority Data
Mar. 12, 2003 (SE) .......................... 0300692

(51) Int. Cl.
*G06F 17/22* (2006.01)
*G07F 19/00* (2006.01)
(52) U.S. Cl. .......................... 705/31; 235/379
(58) Field of Classification Search .............. 235/375, 235/376, 379, 380; 705/1, 4, 8, 16, 19, 31, 705/34, 40, 51, 26, 28, 21, 29, 17; 713/189, 713/168
See application file for complete search history.

(56) References Cited

U.S. PATENT DOCUMENTS

| | | | | |
|---|---|---|---|---|
| 5,569,897 A * | 10/1996 | Masuda | ..................... | 235/379 |
| 5,594,226 A * | 1/1997 | Steger | ..................... | 235/379 |
| 5,903,876 A * | 5/1999 | Hagemier | ..................... | 705/19 |
| 6,003,016 A | 12/1999 | Hagemier | | |
| 6,119,933 A | 9/2000 | Wong et al. | | |
| 6,546,373 B1 * | 4/2003 | Cerra | ..................... | 705/19 |
| 2002/0128916 A1 | 9/2002 | Beinecke, III | | |
| 2002/0143588 A1 * | 10/2002 | Ishigami et al. | ..................... | 705/5 |
| 2003/0070072 A1 * | 4/2003 | Nassiri | ..................... | 713/168 |
| 2003/0128866 A1 | 7/2003 | McNeal | | |
| 2005/0261967 A1 * | 11/2005 | Barry et al. | ..................... | 705/16 |

FOREIGN PATENT DOCUMENTS

| | | |
|---|---|---|
| GB | 225 1100 | 6/1992 |
| GB | 2251100 | 6/1992 |
| WO | WO 9941700 | 8/1999 |
| WO | 9952051 | 10/1999 |
| WO | 00/42546 | 7/2000 |
| WO | WO 0042546 | 7/2000 |

(Continued)

*Primary Examiner* — Matthew S Gart
*Assistant Examiner* — Rokib Masud (57) ABSTRACT

System for handling of refunding of value-added tax to a consumer who has purchased goods in a foreign country includes a central database and first terminals, placed in shops) connected to the system. The first terminals include equipment for entering purchase data. The system creates electronic checks on the basis of the data, and includes information carriers intended to be carried by the purchaser. Personal details, such as name, address and passport number, are stored on the information carrier. An identifying reference is stored on each carrier and the system has computer programs for linking the reference and electronic checks for the person's purchases, and for storing the checks together with their references in the database. Second terminals are provided with equipment for gathering the references from the information carriers of consumers.

51 Claims, 3 Drawing Sheets

FOREIGN PATENT DOCUMENTS

| | | |
|---|---|---|
| WO | 01/31572 | 5/2001 |
| WO | WO 0131572 | 5/2001 |
| WO | 03/079249 | 9/2003 |
| WO | 2004/081838 | 9/2004 |

* cited by examiner

SYSTEM FOR HANDLING REFUNDING OF VALUE-ADDED TAX

TECHNICAL FIELD

The present invention concerns systems for handling of refunding of value-added tax to a consumer who has purchased goods in another tax area than the area where he is resident, for example in another country than his country of residence. The invention also concerns the use of information carriers for customer details in such a system and also the information carrier itself.

BACKGROUND ART

Persons who travel to another country than their country of residence may have the right to a refund of so-called value-added tax when they purchase goods or services abroad. This type of tax is found in many countries and the rate of tax can vary in different countries. In Europe the tax rate for most countries is over 10%. For example, the United Kingdom has so-called VAT (Value-added Tax) at 17.5% on most articles. In Sweden and Denmark this tax is as much as 25% but is somewhat lower for certain goods and services. In Canada this tax on goods and services is 7% and certain provinces have a supplement for provincial taxes. In the USA most states have regional taxes in the order of 1-10%.

With the purpose of stimulating exports, these value-added taxes can in many countries be refunded to persons who are resident outside the country. A condition for this is that purchased goods are exported and used outside the country. In some countries, such as Canada, a refund of value-added tax can be obtained for tax on things other than goods, such as tax on hotel rooms.

Hitherto, it has been very complicated for tourists and other visitors to a foreign country with value-added tax to obtain a refund of this tax. Ways of carrying out the refund vary between different countries. In some countries, visitors are allowed to apply for a refund when they leave the country, for example in transit areas at airports or near borders. However, the visitor must gather receipts and decide which purchases are entitled to a refund. The visitor must also complete forms in foreign languages, which forms must be checked by customs officials at the same time as the purchases must be presented. The visitor must therefore queue at a refund counter and there receive the refund often in the currency of the country in question, which in turn means that the visitor must later stand in an exchange queue in order to receive his refund in the desired currency.

One example of a process for refunding value-added tax is practised in Canada. According to this process, a person who has visited the country must post from outside the country a refund form together with original receipts for all purchases. Thereafter, it takes at least six weeks before the Canadian agent handles the case and sends the refund. The refund is paid in Canadian dollars and therefore when the visitor receives the cheque, he must also change it to the currency of his own country.

Another way of refunding value-added tax (VAT) is practised in the United Kingdom. For each purchase for which a refund is possible, the visitor must prove his right to a refund by presenting his passport to the sales assistant. Certain retailers may also demand a minimum purchase before a refund can be received. Visitors must then in the shop complete a special refund form which is supplied by the retailer.

When the visitor leaves the European Community, all refund forms and corresponding goods must be presented to a customs official and the visitor receives a customs stamp on the above-mentioned form. If the visitor neglects to certify the refund form at the customs, he may lose the opportunity of receiving a refund later.

In many cases, goods have already been checked in and the customs official can approve the documents even if all the goods cannot be presented.

Once outside the European Community, the visitor must post a customs-stamped refund form to each shop where the person made a purchase. The retailer will then deduct a fee and send a cheque in Euros for the remaining amount to the customer, who then can change it to a currency that can be used in his homeland.

Other countries have other special rules that must be fulfilled in order to obtain a refund of value-added tax.

As can be seen from the above, it is possible for individuals to receive a refund of value-added tax which has been paid on purchasing goods in foreign countries. However, as has been seen, this is extremely complicated for certain countries. Furthermore, the rules vary, which makes it considerably more difficult for persons visiting several countries during a trip.

The purpose of enabling value-added tax to be refunded to people who are resident in another country is of course to try to stimulate export of goods. With the aim of preventing tax fraud, different countries have chosen, as has been exemplified above, to introduce different rules which must be met in order to allow foreign visitors to receive refunds of value-added tax.

There exist service companies, which have set up businesses to enable easier handling of refunds of value-added tax for both tourists and shops. In shops which are collaborating with these service companies, tourists are given refund forms which have to be completed with certain personal details. Goods and forms are presented at customs and forms are provided with the requisite customs stamp. The above-mentioned companies have service points at international airports and at border stations where tourists can obtain their refund directly in the desired currency. The company then takes care of all paperwork and bills the shops.

If a customer forgets or does not have time to visit the above-mentioned service points for refunding value-added tax, the customer can also send the requisite documents to the service company afterwards. The service company can then, with the aid of the documents, deposit the tax refund in the customer's bank account or the like.

These service companies considerably simplify the procedure for tourists and doubtless considerably stimulate sales for the participating shops.

However, there is a need for further simplification for both shop-owners and tourists.

There is still a great deal of time-consuming paperwork for the shops, which, for each new customer who is perceived to be a tourist or states himself to be a tourist, must furnish refund forms and in addition must explain to the tourist how to fill them in. This time-consuming practice reduces the flow of paying customers through the shop and there is a great need to simplify the routines and reduce the paperwork.

It is still complicated for the tourists because they have to complete a new form in each new shop. Furthermore, they must keep all the receipts in order to be able to obtain a refund of value-added tax.

WO 00/42546 suggests a system for simplifying the refunding of value-added tax. The said system comprises an advanced transaction card, which is intended to cooperate with card terminals to execute the purchase transaction and generate transaction data. An application for a tax refund is stored directly on the transaction card, which is arranged to calculate the tax refund corresponding to the entered purchase data. However, the system suggested in WO 00/42546 is not realistic because it does not take into account the requirements of different countries for checking of transactions regarding refunding of tax. Essential data, such as the cardholder's passport number and home address, is also difficult to store on the transaction card since these details must be able to be changed, for example if the card holder changes his home address. For the individual consumer it is regarded to be inconvenient to have yet another "credit card" to look after and carry with one on trips abroad.

In WO 01/31572 is described a system and a method concerning how companies can manage their obligation to show their account of value-added tax (VAT) to the tax-authority of the country. This is however something that is completely different from the measures required for handling refund of VAT to a tourist who has purchased goods in another country than his country of residence. A tourist receives this refund via the shop with the assistance of a service company and first after the tourist has been able to prove his right to refund and further first after he has exported the goods and this export has been confirmed by custom control and a tax refund form has been duly stamped by a custom inspector. A tourist has no obligation to show account to tax-authority of the country where the goods is purchased. Instead it is the shop that sells the goods that has an obligation to show account for VAT.

U.S. Pat. No. 5,903,876 describes a method which necessitates the use of a new "VAT CARD" or alternatively a new "COMBINED VAT CREDIT CARD", i.e. a user must apply for a new card and then have a further permanent card to keep in order in addition to his other payment cards or credit cards. U.S. Pat. No. 5,903,876 does not describe a realistic method as it presupposes that authorities in different countries accept refund of VAT without performing a custom check. In the method described in D1 it is not checked whether the goods are exported or not.

GB 2 251100 A describes a system related to refund of VAT. GB 2 251100 A is however very scanty with regards to the function of the system. The described system is very complicated and time demanding for the customer. When making a purchase in a shop the customer gets a receipt or a so called "entry on a delivery docket". When the customer has done his purchases in a shop the customer must then go to a specific export stand situated somewhere in the shop. At this export stand there is a data terminal with a printer, which equipment, after the customer has shown the receipts or said "entries", are arranged on basis of the information from said receipts or entries print out a "multi-part form". One part of this "form" is kept by the customer as a verification while a second part is intended to be shown at custom check together with purchased goods and must be provided with custom stamp to enable the customer to get refund of VAT at a service company ("tax-accountable organisation") with office in connection with the custom check, for instance in an air-port. The remaining parts from said "multi-part form" are required for accounting and audit purposes." A serial number which identifies each receipt and "entry" and also identifies the shop is added to said data terminal. It should also be noted that not the whole transaction but only data "relating" to transactions are recorded in the central database.

The forms which are carried by the customers are stamped in custom and these stamped forms are provided with indexes and are stored in order to be able to make account for the tax authority. According to GB 2 251100 A it is the paper forms that are stored.

As is evident from the above, there is a great need, from the point of view of both retailers and consumers, to improve the present system for refunding value-added tax to tourists.

DISCLOSURE OF INVENTION

The present invention is characterised in, that the system comprises a central database,
that the system comprises first terminals, which are placed in shops that are connected to the system, and which are connected to the database via a network,
that said first terminals are provided with equipment for entering purchase data, that the system has programs for adding system-generated data to said purchase data,
that the system is arranged to create an electronic cheque on the basis of said data,
that the system comprises information carriers for personal details, that the information carrier is intended to be carried by the person in question, that personal details, such as name, address and passport number, are stored on each respective information carrier, that a reference identifying the information carrier is stored on each information carrier, that the system comprises computer programs for linking said reference for a person's information carrier to an electronic cheque(s) for the person's purchases, and for storing the cheques together with their references in a database,
that the system comprises second terminals, which are connected to the database via the system's network, that said second terminals are provided with equipment for gathering said references from consumers' information carriers, that the second terminals are arranged to gather an electronic cheque(s) belonging to the references from the database, whereafter the purchase data of all of a consumer's cheques can be presented together with personal details for customs inspection.

The electronic cheque handling shortens the lead time for the shop. Initially, the electronic cheque does not require any tourist data, such as the name and address of the customer. The customer is connected with each purchase via a unique reference on information carriers included in the system. The customer can then at a later date complete the information carrier with requisite tourist data himself, if this is permitted. Otherwise, the tourist data can be registered before or during the purchase. The tourist data is linked with the purchase data on the electronic cheque later, for example during a customs inspection or at a refund point. Thus, with the system in accordance with the invention, the shop can avoid all work connected with entering of tourist data.

According to one embodiment, the invention is characterised in that the information carrier is constituted by a card or sheet and has a reference number, serving as said reference, stored on the card or sheet.

According to one embodiment, the system in accordance with the invention is characterised in that said reference number is constituted by a serial number.

According to another alternative, the system according to the invention is characterised in that said reference number is constituted by a serial number and an code.

According to a modified embodiment, the invention is characterised in that said reference number is constituted by one ore several identification numbers for, for example, a shop or terminal, followed by a serial number.

According to a somewhat modified embodiment, the invention is characterised in that the reference number also comprises a code.

According to another embodiment, the invention is characterised in that the said reference number is constituted by a unique code stored in the database.

According to another embodiment, the code is constituted by an encryption.

According to another embodiment, the code is constituted by a random number.

According to another embodiment, the invention is characterised in that said reference number is complemented by a code which is stored not on the said information carrier but in alternative form, wherein the holder, when using the information carrier on all subsequent occasions, presents the code together with the information carrier.

According to one embodiment, the system according to the invention is characterised in that suitably all and at least some of said second terminals are provided with equipment for reading personal data from the information carrier of a consumer.

The system according to the invention is characterised, in accordance with another embodiment, in, that the system is arranged to collect electronic cheque(s) belonging to said information carrier and to present personal data together with the cheque(s) on a monitor belonging to said second terminal, wherein personal data and electronic cheques can be checked by customs staff via the monitor and wherein current purchases can be verified by presenting the goods at the customs, and that purchase data approved at the customs and personal data pertaining to them are stored in the database.

According to one embodiment, the system in accordance with the invention is characterised in, that equipment is arranged, when personal data and corresponding purchase data are shown on the monitor, to complete said data with electronic customs stamps, and that the system is arranged to thereafter store a correlated data set of approved purchase data, corresponding personal data and corresponding electronic customs stamps.

According to an especially suitable embodiment, the invention is characterised in, that said information carrier is constituted by an individual card intended for personal details and intended to be carried by the consumer for repeated purchases abroad.

According to a suitable embodiment, the card is provided with a reference number written in plain text.

According to one embodiment, the card is provided with areas in which personal data, such as the person's name, address and passport number are to be written in plain text.

According to one embodiment of the system, the invention is characterised in that the first terminals are provided with equipment for reading the reference number from said individual cards.

According to one embodiment, the system in accordance with the invention is characterised in, that the first terminals are arranged to register purchases in the form of electronic cheques and to store these in the database linked to reference numbers.

According to one embodiment, the system in accordance with the invention is characterised in that the first terminal is arranged to feed out to the consumer a receipt comprising a statement regarding the total sales tax on each purchase.

According to an alternative embodiment, the system in accordance with the invention is characterised in, that the information carrier is constituted by a refund voucher for purchases made on one purchase occasion, that the first terminal is arranged to feed out said refund voucher via the standard printer of the first terminal, wherein said reference is stated on the refund voucher and is stored in the central database linked to the electronic cheque for said purchase on one purchase occasion, that the refund vouchers have areas for writing personal data, such as name, address and passport number, that the refund vouchers are carried by the respective consumer as proof of the right to a refund, and that the references, such as said reference number, for all of a consumer's purchase occasions are intended to be entered in the second terminals in order to extract the consumer's entire purchase data from the database for presentation in connection with a customs inspection.

According to one embodiment, the system in accordance with the invention is characterised in, that the information carrier is constituted by a card, which is provided with a magnetic strip on which at least the reference number is stored, and in that at least some of the terminals included in the system have magnetic strip readers for reading information from the consumer's card and transferring it to the terminals.

According to one embodiment, the invention is characterised in, that the reference number of the information carrier is constituted by figures written in visible text, and that the terminals have equipment which enables information to be read and transferred from the information carrier to the terminals by means of optical reading and/or entering manually.

According to another embodiment, the invention is characterised in, that the reference number of the information carrier is given in the form of a bar code and that suitably all and at least some of the terminals are provided with bar code readers.

According to a further embodiment, the system in accordance with the invention is characterised in that the information carrier is constituted by a card, that this card has the format of a credit card and has figures stored in a chip, as in smart cards, and in that suitably all and at least some of the terminals are provided with chip readers for reading and transferring information from the chip on the cards, smart cards, to the database via the terminals.

According to one embodiment, the system includes information carriers on which personal data for the customer, such as the customer's name, address and passport number, can be written manually with a pen.

According to one embodiment of the invention, the invention is characterised in that the system includes terminals, which comprise keyboards for entering personal data in plain text on the information carriers.

According to another embodiment, the invention is characterised in, that the information carriers are constituted by cards, preferably with credit card format, and that suitably all and at least some of the first terminals are arranged for electronic transferral of personal data to a magnetic strip or a chip on the card.

According to a further embodiment, the system in accordance with the invention is characterised in that suitably all and at least some of the first terminals have equipment for entering personal data on the information carriers in the form of code, bar code or another type of code.

According to another embodiment of the system in accordance with the invention, this system is characterised in, that the second terminals are constituted by automatic machines, and that said automatic machines are connected to the central database and are intended to link the customer's personal data to the corresponding electronic cheques when the customer inserts the information carrier into the automatic machine.

According to one embodiment, the system in accordance with the invention is characterised in, that said automatic machines have a camera, in front of which the customer places purchased goods and his passport or other document that are to be checked by customs, and that customs officers can read information carriers and electronic cheques via a fourth terminal and, via said camera, compare presented goods with cheques gathered from the database and thereafter provide approved cheques with electronic customs stamps in the form of electronic signatures, and that the system is arranged to store in the database the verification in the form of electronic customs stamps that the cheques are approved for refund of sales tax.

In the event that a customs authority for a country does not want electronic handling of customs documentation, the invention is characterised, according to a modified embodiment, in that the purpose of the second terminals is to link a consumer's reference number to corresponding electronic cheques which are stored in the database and in that the second terminals have or are connected to printing equipment for printing one or several forms containing details of a consumer's current purchases and also requisite personal information for customs inspection, wherein said forms are intended to be provided in the conventional way with a customs stamp at customs for the verification of the export of the goods in question, and that the system is arranged to store in the central database information regarding which electronic cheques and information carriers have been linked in order to print out forms, and in that the system is provided with barriers to prevent printing out identical forms with identical purchase data.

The present invention also comprises use of information carriers for customer details in a system for handling refunding of sales tax to a consumer who has purchased goods in another tax area than the area where he is resident, for example in another country than his country of residence.

The invention is primarily characterised in that the information carrier is intended to be carried by the person, that personal data is registered on the information carrier, that the information carrier, and thus the personal data, are intended to be linked with all of the holder's purchases for calculation of the total refund to the customer, that, when goods are purchased, the purchase is registered as an electronic cheque in a central database belonging to the system via a first terminal located in the shop, that a reference identifying the information carrier is stored on each respective information carrier, that the system includes computer programs for linking said reference for a person's information carrier and electronic cheque(s) for the person's purchases and storing the cheques and corresponding references for the information carrier in the database.

According to another embodiment, the use is further characterised in that the system includes second terminals, which are connected via the network of the system to the database, that said second terminals are provided with equipment for gathering said references from consumers' information carriers, that the second terminals are arranged to collect electronic cheque(s) corresponding to said references from the database, whereafter the purchase data of all of a consumer's cheques can be presented together with personal details for a customs inspection.

According to another embodiment the use is further characterised in that the information carriers are constituted by cards with credit card format.

According to one embodiment, the said cards are made of paper.

According to one embodiment, the use in accordance with the invention is characterised in, that the information carrier is constituted by a card or sheet and that a reference number serving as said reference is stored on the card or sheet.

According to one embodiment, the use in accordance with the invention is characterised in that said reference number is constituted by a serial number.

Alternatively, said reference number can, in accordance with the invention, be constituted by a serial number and code.

According to a further embodiment, the invention is characterised in, that said reference number comprises one or several identification numbers for, for example a shop or terminal, followed by a serial number.

According to a somewhat modified embodiment, the invention is characterised in, that said reference number also comprises a code.

According to another embodiment, the invention is characterised in that the reference number is constituted by a unique code stored in the database.

According to a modified embodiment, the invention is characterised in, that the reference number is stored by means of a bar code as well as in plain text and that suitably all and at least some of the terminals included in the system, in shops, in connection with customs points and at refund points, are provided with bar code readers.

According to an alternative embodiment, the use in accordance with the invention is characterised in, that the reference number is stored on a magnetic strip arranged on the card as well as in plain text and that suitably all and at least some of the terminals included in the system, in shops, in connection with customs points and at refund points, are provided with magnetic strip readers.

According to another embodiment, the invention is characterised in that said code is constituted by an encryption.

According to another embodiment, the invention is characterised in that said code is constituted by a random number.

According to another embodiment, the invention is characterised in that said reference number is complemented by a code which is stored not on said information carrier but in alternative form, wherein the holder, when using the information carrier on all subsequent occasions, presents the code together with the information carrier.

According to a further alternative, the use in accordance with the invention is characterised in, that the reference number is stored on a chip arranged on the card as well as in plain text and that suitably all and at least some of the terminals included in the system, in shops, in connection with customs points and at refund points, are provided with chip readers.

The use in accordance with the invention is characterised, according to one embodiment, in that the cards are provided with areas in which requisite personal data, such as the person's name, address and passport number are to be written.

According to one embodiment, the invention is characterised in, that the terminals included in the system are provided with equipment for reading from said individual card the reference number stated in plain text on the card.

According to one embodiment, the invention is characterised in that suitably all and at least some of the terminals included in the system have equipment for manually entering the reference number stated in plain text.

According to a further embodiment, the invention is characterised in that the information carriers have personal data stored on a magnetic strip or in a chip on the information carrier.

According to one embodiment, the use in accordance with the invention is characterised in that the information carriers have personal data stored on a magnetic strip or in a chip on the information carrier.

According to one embodiment, the use is characterised in that suitably all and at least some of the first terminals have equipment for entering personal data on the information carriers in the form of code, bar code or another type of code.

According to one embodiment, the use according to the invention is distinguished in that at least some of the second terminals which are part of the system are constituted by automatic machines, and that said automatic machines are connected to the central database and are intended to link the customer's personal data to the corresponding electronic cheques when the customer inserts the information carrier into the automatic machine.

According to a modified embodiment, the use according to the invention is characterised in, that said automatic machines have a camera, in front of which the customer places purchased goods and his passport or other document that are to be checked by customs, and that customs officers can read information carriers and electronic cheques via a fourth terminal and, via said camera, compare presented goods with cheques gathered from the database and thereafter provide approved cheques with electronic customs stamps, and that the system is arranged to store in the database the verification in the form of electronic customs stamps that the cheques are approved for refund of sales tax.

According to a further embodiment, the use in accordance with the invention is characterised in, that the purpose of the second terminals is to link a consumer's reference number to corresponding electronic cheques which are stored in the database and in that the second terminals have or are connected to printing equipment for printing one or several forms containing details of a consumer's current purchases and also requisite personal information for customs inspection, wherein said forms are intended to be provided in the conventional way with a customs stamp at customs for the verification of the export of the goods in question, and that the system is arranged to store in the central database information regarding which electronic cheques and information carriers have been linked in order to print out forms, and in that the system is provided with barriers to prevent printing out identical forms with identical purchase data.

The invention also comprises information carriers in a system for handling refunding of value-added tax to a consumer who has purchased goods in another tax area than the area where he is resident, for example in another country than his country of residence.

The invention is characterised in that the information carriers are constituted by cards with credit card format, which cards are made of paper and each of which is provided with a respective reference number identifying the card, comprising a number and an encrypted code, which reference number can be read in plain text, that the reference number is also stored electronically on the card, that the cards are provided with areas for entering requisite personal details, such as the card holder's name, address and passport number, that, when goods are purchased, the purchase is registered in the form of an electronic cheque together with the reference number in a central database belonging to the system via a first terminal placed in a shop, that the card is intended for repeated purchases and intended to be linked to all of the card holder's purchases so that the total refund to the customer can easily be put together and calculated.

According to one embodiment, the information carrier is characterised in that the reference number is electronically stored on a magnetic strip on the card or in a chip arranged on the card.

According to a further embodiment, the information carrier according to the invention is characterised in, that said personal details are stored electronically on a magnetic strip on the card or in a chip arranged on the card.

DESCRIPTION OF THE FIGURES

The invention shall be described in more detail below with reference to embodiments shown in the attached drawings, in which.

Figure 1:
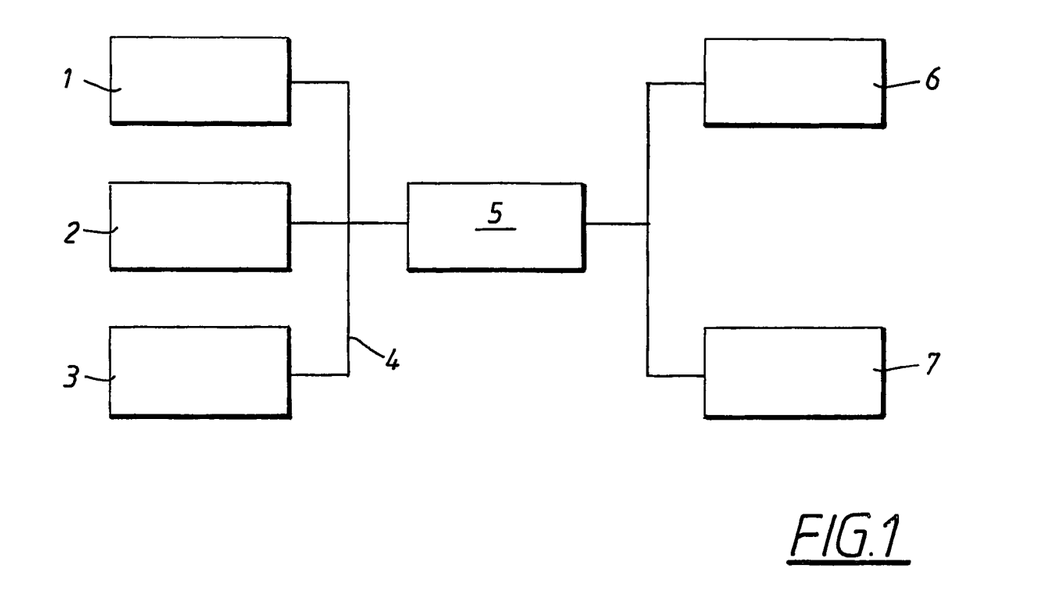
FIG. 1 shows a block diagram of a first embodiment of the system according to the invention.

In FIG. 1 a number of shops 1-3 have been shown, which shops are connected to a system in accordance with the invention and which here represent shops in one country. The shops are each provided with a first terminal, which, via a network 4, is connected to a central database 5 forming part of the system. This is connected via the network 4 to second terminals located in toll stations 6. The system also comprises refund points 7, which are provided with third terminals. The embodiment shown in FIG. 1 is greatly simplified for the sake of clarity. The aim is of course that a large number of shops and stores in different countries will be connected to the system in the same way as the present system is part of an international flow. Correspondingly, a large number of customs stations 6 and a large number of refund points 7 will be included.

The following describes how the system works, with reference to several purchase examples.

In shop 1, a tourist purchases three diamonds, which together cost 100 000 SEK, and a pearl, which costs 50 000 SEK, The value-added tax (VAT) for these purchases will amount to 37 500 SEK in total at a VAT rate of 25%. The person in question is identified as a tourist, either through the person himself stating this or through the sales assistant noticing it. For example, it may be seen from the customer's debit card that he is resident in another country.

According to a preferred embodiment, the system includes information carriers in the form of individual cards, which are intended for personal details and intended to be carried by the consumer for repeated purchases abroad during a continuous period in connection with their stay abroad. Information carriers in the form of cards are furnished by shops participating in the system and suitably also hotels. Other methods of distribution for handling the cards are, of course, also possible.

Figure 2:
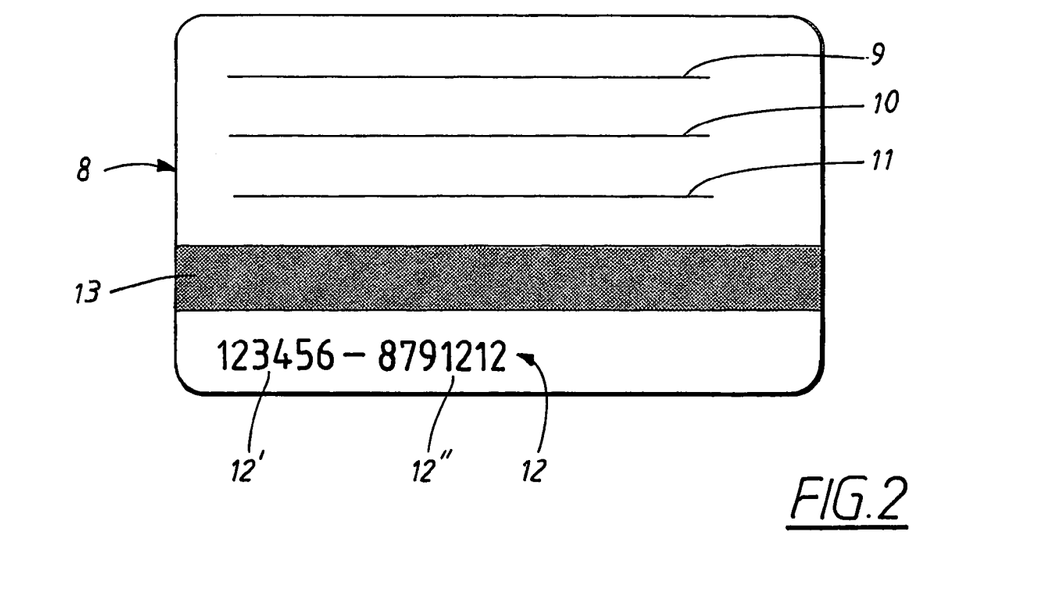
FIG. 2 shows an embodiment of an information carrier intended for tourist data in accordance with the invention.

FIG. 2 shows an embodiment of a card 8 serving as an information carrier. This suitably has the format of a credit card. According to a suitable embodiment, the card is made of paper. There are a number of reasons for making the card of paper. Manufacture will be cheaper than plastic cards. Furthermore, the fact that it is made of paper indicates that the period of usage for the card is intended to be relatively short. Firstly, consumers do not want to have further permanent cards to look after and secondly, the system will be considerably safer if cards for individual users are cancelled after a period of use, suitably in connection with the refund of VAT at a refund point. A further reason for making the card of paper is that it is then easy to write on it requisite tourist data, such as name, address and passport number. The card shown in FIG. 2 has a number of areas 9, 10, 11, where said details, name, address and passport number, are intended to be written. In the shown embodiment, the card has a reference number 12, which consists of two parts, a first number, which in the shown embodiment is constituted by a simple serial number 12', and an encrypted number code 12". The number can, as has been mentioned, consist of a simple serial number or of a number which represents one or several variables, such as shop, type of card, country, etc. The purpose of the reference number is, as will become evident below, to link the card with the inscribed tourist details to the purchase information in the database.

The card 8 in the shown embodiment is provided with a magnetic strip 13, on which at least the reference number, number and encrypted code, are stored.

It is also conceivable that tourist data can be entered onto the magnetic strip via shop terminals by the consumer, which would increase security against fraud.

The encryption is a number that is constructed in such a way that a sequence of numbers cannot easily be calculated. The best encryption is a series of random numbers. Perfectly random numbers are by definition impossible to guess with greater probability than the inverse of the maximum size of the random number.

The encryption is used to prevent forgery of cards and reference numbers. If only numbers without the addition of encryptions were used, forgery of cards, which can then be used, could occur in the following manner:
1. Collect a number of cards from the same shop, preferably in sequence, and calculate how the number, and thus the number series, is constructed. For example, shop identity number+serial number: 123+100=123100.
2. Obtain a card from a shop. For example, 123104.
3. Make one's own card, which lies sequentially after the one that was obtained, i.e. 123105.
4. Go to the customs and have the transaction approved, which implies deceiving the customs when the goods are checked.
5. Thereafter, go to a refund point and collect the money.

In a more suggested variation, one follows a person whom one knows to have received number 123105. As soon as the person has shown the goods to customs and had the purchase verified, one has an accomplice collect the money with a forged card at a refund point.

As mentioned above, the best encryption is a series of random numbers. The only way to verify a reference number encrypted in this way is to compare the reference number to a register of all reference numbers, i.e. number+encryption. A disadvantage of such a manner of encryption is that if the reference number is stored only on a central database, the register may not be accessible when a verification of the reference number is required. For example, such a check cannot be carried out if there is no functional direct link to the central database.

An alternative to an encryption of the type described above is to use an encryption that is generated with the aid of an encryption algorithm. This would take some known information, for example the number, and encrypt it. A condition with this method is of course that it is possible to protect the encryption algorithm in a satisfactory way, as a fraudster who gained access to the encryption algorithm would be able to create valid reference numbers.

The person who, in accordance with the above, is identified as a tourist after purchasing diamonds and a pearl will receive an information carrier in the form of a card of the kind described above.

The form of the reference number can be varied in a number of different ways over and above what is described above. For example, the reference number can be constituted only by a simple serial number. A disadvantage of this is that the information carrier is easier to forge than a reference number that also contains a code, such as an encryption.

One alternative is that the reference number is constituted only by an encryption of a number stored in the database.

Another suitable alternative is that the reference number is constituted by a serial number and a random number.

According to a further alternative, the reference number can be constituted by a serial number and a pin code that has been chosen for or allocated to the serial number. This code must be stated by the card holder in, for example, the second terminal in order to link the information carrier with the purchase data corresponding to its reference number.

The purchase is registered in a first terminal, a shop terminal, forming part of the system. This can be designed in various ways. Suitably, the shop terminal has a small and compact format and can be constituted by credit card terminals found in stores, which have been modified to also serve as terminals for information carriers. The actual registration of the purchase in the shop terminal can also take place before the person in question has been identified as a tourist with the right to a refund of value-added tax, which identification can take place during transaction of a card purchase.

The tourist's reference number is registered in the terminal and linked electronically with the registered purchase. The registration of the reference number can take place in a number of different ways depending on how the card is formed, how the reference number is stored and how the shop terminal is formed. Various alternative ways of storing the reference number and corresponding equipment in shop terminals are described below.

The reference number is at least written on the card with visible text, whereby it is always possible to enter the reference number via a keyboard into the first terminal, the shop terminal. However, it is essential that the reference number can normally be entered quickly via the shop terminal using some form of reader. If the reference number is only stored in plain text, the shop terminal can be provided with an optical reader, such as an OCR reader.

Alternatively, as well as in plain text, the reference number can be stored on a magnetic strip arranged on the card. If the card is designed in this way, the shop terminals shall suitably be equipped with a magnetic strip reader.

Alternatively, as well as in plain text, the reference number can be given in some form of bar code or other type of code. If the card is designed in this way, the shop terminal shall be provided with a bar code reader or other reader suitable for the code.

According to another alternative, the reference number can be stored in a chip, smart card, as well as in plain text. If the card is designed in this way, the shop terminals shall suitably be provided with chip readers.

As can be seen from the above, all shop terminals do not need to be provided with some form of reader as it is possible to enter reference numbers via a keyboard.

If the reference number, as well as in plain text, is stored in another form than is described above, the shop terminals shall of course suitably be equipped with a suitable reader for electronic entering of the reference number.

The shop terminal has equipment, for example a keyboard and suitably also a bar code reader, for entering purchase data.

In addition, the shop terminal has software with the following functions:
1. Lets the user register purchase information in accordance with requirements in agreements and laws.
2. Lets the user register/read the reference number.
3. Stores information regarding the purchase, the card and the shop on the central database 5.

The information registered in the shop terminal regarding the purchase, together with the electronically linked reference number, which links the information carrier 8 and thus the tourist to the current purchase, are transferred via the network 4 to the central database 5. At the time of purchase, the sales assistant can confirm with an electronic signature that value-added tax can be refunded on the current purchase.

The purchase details and corresponding reference number are stored, as mentioned above, in the central database. The system has programs for adding system-generated data, for example calculation of VAT, to entered purchase data. The degree of detail in the central database is decided by legal and contractual requirements. For example, the following purchase information can be stored in the database.

| Shop | Number | Item | Price | VAT | Reference number |
|---|---|---|---|---|---|
| 1 | 3 | Diamonds | 100 000 | 25 000 | 123456-8791212 |
| 1 | 1 | Pearls | 50 000 | 12 500 | 123456-8791212 |

The same tourist later goes into a watchmaker's and buys a watch for 150 000 SEK, of which 37 500 is VAT. In connection with the purchase, the tourist presents his refund card and identifies himself as a tourist. The purchase is registered in a shop terminal. The system shall of course be so flexible as to allow purchase data to be entered before or after the customer presents his refund card. The reference number is registered/read in the shop terminal and the sales assistant checks electronically that a refund of value-added tax is possible for the current purchase. The purchase details and corresponding reference number are stored in the central database.

The database now contains the following information:

| Shop | Number | Item | Price | VAT | Reference number |
|---|---|---|---|---|---|
| 1 | 3 | Diamonds | 100 000 | 25 000 | 123456-8791212 |
| 1 | 1 | Pearls | 50 000 | 12 500 | 123456-8791212 |
| 2 | 1 | Watch | 150 000 | 37 500 | 123456-8791212 |

If the country in question does not require that receipts be kept, the tourist does not require to keep all the purchase receipts in order to receive the VAT refund. It is sufficient in that case to keep the refund card, which can be used for an unlimited number of purchases during the stay abroad in question.

However, the system in accordance with the invention also comprises a method wherein the refund card is only intended to be used once per shop.

In order to receive the tax refund, the goods must be presented at customs at an airport or at a border crossing. In countries where the customs authorities approve electronic handling of all purchase information and corresponding tourist data, the flow in the system for the country in question will be as is seen in FIG. 1. At customs stations there are second terminals 6, which are linked via the network 4 to the central database 5. The second terminals have equipment for reading details on the information carrier, i.e. the refund card 8. The reading includes reading of both the reference number and tourist data on the card. The tourist data and corresponding reference number are stored in the central database. In addition, at the customs station there is an interface for checking the purchase data of the tourist in question, which is in the central database. Thereafter, all purchase transactions or a single purchase or, alternatively, a part of a purchase can be examined for the purpose of possible approval.

According to one embodiment, the second terminal has software that does the following:
1. Lets the user examine the purchase data with a view to approval of a tax refund. This examination can be carried out on all purchases as a whole, per purchase occasion or per item.
2. Saves approved or not approved on the chosen level.

An overview of the sequences which take place in connection with possible customs approval of each purchase will be described below.
1. A tourist's refund card is read in the second terminal, which is located at a customs checkpoint.
2. Purchase data is gathered from the central database and all details, such as tourist data and goods, are verified.
3. The approved purchases are marked as such.
4. The verification that the transactions are approved for refund or that a refund is not approved is stored in the central database.
5. In addition, the tourist data on the card is saved, either as an image or as data that has been read. Alternatively, this tourist data can be saved at a later stage.

According to an alternative embodiment, instead of second terminals that are constantly manned by customs officials, customs inspection can be carried out with the aid of partly automatic checks. In this embodiment, the second terminals are constituted by the system of automatic machines, which are located in a duty-free zone of an airport or at a border station. At customs points where there is a large flow of travellers, there may be a need for several automatic machines. These automatic machines are linked to the central database and are intended, when the customer inserts the information carrier, the refund card, in the automatic machine, to link the customer's information carrier with corresponding electronic cheques stored in the central database. The automatic machines have a camera in front of which the customer places purchased goods that are to be inspected by customs. This embodiment includes fourth terminals, which are used by customs officials. Via this fourth terminal, customs officials can read information carriers and corresponding electronic cheques for a customer who at the same time is showing his goods in the automatic machine, and compare the goods with cheques taken from the central database and thereafter provide approved cheques with electronic customs stamps. Advantages of automatic machines include the fact that presentation to the camera and corresponding inspection need not take place simultaneously and that customs officials avoid waiting time when the customer is looking for or getting out the goods in question.

The customs official's signing can include, for example, export date, place of customs inspection and customs officer's electronic signature.

After verification at customs of the right to a refund, the customer, or tourist, can go to a refund point that is part of the system. These are located in connection with customs stations, for example in the shopping area of an airport. At the refund points 7, there are third terminals, which are linked via the network to a central database 5. The staff at the refund points have access via the network to all information that is stored in the database and via computer screens can check the right of individual customers to a refund of value-added tax on purchases made abroad.

The following occurs at the refund point:
1. A customer, a traveller returning from abroad, presents his refund card, which is read in a third terminal. The identity and passport number of the customer are checked and compared with details on the card. After the card has been read, its number is checked. As the number partly consists of an encryption, the system will be very secure.

2. A check is made in the central database to establish if a customs stamp exists for the purchase in question and how much money shall be paid out.

3. The go-ahead is given to pay out the money.

4. After the payment has been carried out, this is recorded in the central database.

The refund point can also be constituted by an automatic machine that is linked to the system's network. The automatic machine is provided with a card reader for reading the customer's reference number. A check is made in the central database to establish if a customs stamp exists for the purchase in question and how much money shall be paid out.

In order to obtain money via the automatic machine, the customer must insert a credit card for transfer of the money to an account linked to the credit card.

Figure 3:
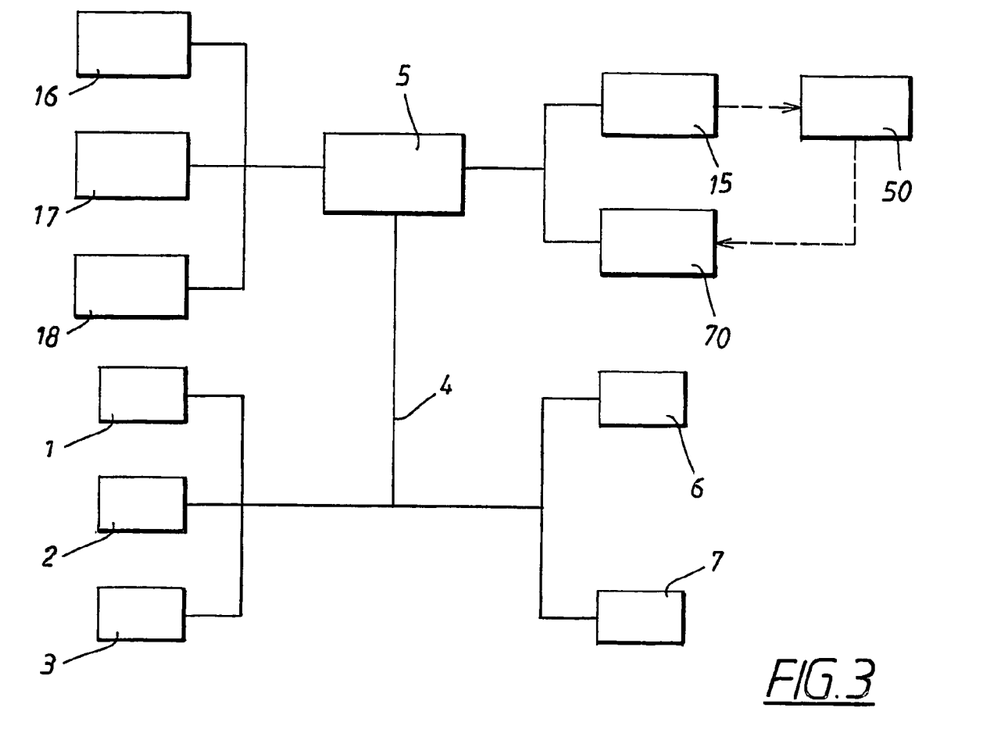
FIG. 3 shows a block diagram according to a second embodiment of the system in accordance with the invention.

FIG. 3 shows a block diagram of the flow in the system, which is somewhat modified in relation to FIG. 1. FIG. 3 shows in simplified form a system flow comprising a country where the authorities do not permit the customs to electronically handle and verify purchases of goods where the customers have the right to a refund of value-added tax. The system in accordance with the invention is constructed to be able to smoothly handle refunds of value-added tax even for countries where the customs authorities still require handling of paperwork which can be physically checked and provided with the requisite stamps.

A flow in accordance with FIG. 3 can be used even if the refund point is not connected and can thus be suitable even if the authorities do not require paperwork.

In the system according to FIG. 3, a help station 15 is included, which has a terminal that is linked to the central database 5 via the network 4. These terminals are named second terminals since they fulfil essentially the same function as the second terminals described in connection with FIG. 1. The only difference is that the terminals are linked to printers in order to print out paper cheques on the basis of purchase details stored in the database.

For the sake of simplicity, only three shops 16, 17 and 18 linked to the system in the country in question have been shown in the drawing. In reality, a very large number of shops and stores in various countries are of course linked to the system.

The following occurs in the help terminals:
1. A tourist's refund card is read in the second terminal in the help station 15.
2. The tourist details on the card are stored in the central database, either as an image or by means of read data.
3. A refund cheque, on which information stored in the database has been combined with the information given on the tourist's refund card 8, is printed out in the help station 15. One form is printed out for each purchase occasion.
4. It is noted in the central database that the card and data have been "married", which prevents a card from printing out several refund cheques.

In FIG. 3 the customs station in the country which requires paperwork at the customs has been denoted 50. This customs station has no connected terminals and the flow has here been indicated with dashes. The tourist carries with him the required form in the form of the said refund cheque which has been produced in the help station 15 for the customs station 50, where inspection of the form is carried out and compared with presented goods. Thus, a check of purchase data and the requisite personal check are carried out at customs. Approved refund cheques are furnished in the conventional way with the requisite customs stamps.

When the tourist arrives at a refund point, the customs stamp on the refund cheque is checked. After this inspection, the refund can be carried out in the same way as described above. However, a completely automatic refund in an automatic machine cannot be carried out as the customs stamp must be checked.

Figure 4:
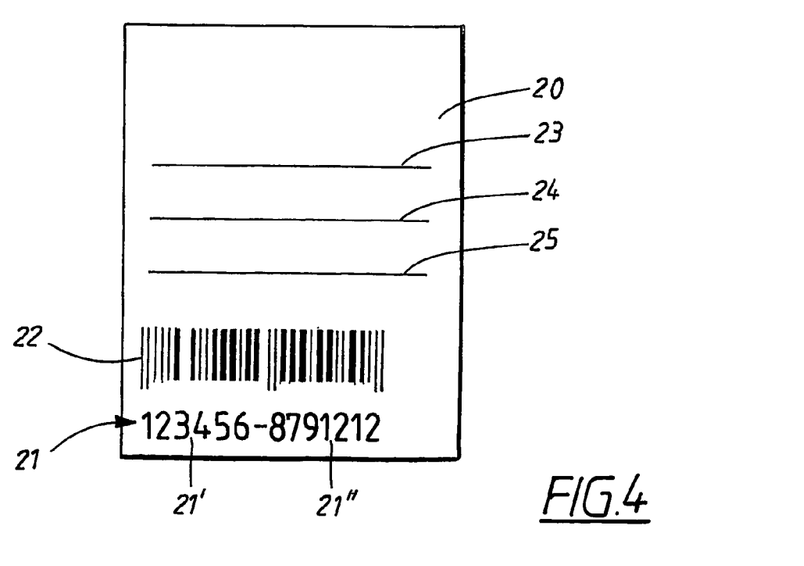
FIG. 4 shows an alternative embodiment of an information carrier intended for tourist data.

FIG. 4 shows a second embodiment of an information carrier which is part of an alternative embodiment of the system in accordance with the invention.

The information carrier in accordance with FIG. 4 is constituted by a refund receipt, which has been printed out on standard paper with the standard printer of the terminal. This refund receipt is not intended to be used for repeated purchases but is entirely related to the current purchase. As in the above-described embodiment, a reference number 21, comprising, for example a serial number 21' and an encrypted code 21" can be given on the refund receipt 20. In the shown embodiment, the reference number is given in a bar code 22. Precisely as in the previous system described with reference to FIGS. 1-3, the reference number is linked to an electronic cheque regarding the purchase in question. On the refund receipt 20 there are areas 23, 24, 25 for inscription of tourist details, such as name, address and passport number. In order to obtain a refund of value-added tax on all purchases, the tourist must save the refund receipts for all purchases.

Apart from the fact that a refund receipt is received for each purchase, the alternative system with separate refund receipts functions in essentially the same way as the system described above with reference to FIGS. 1-3. The different steps in the alternative system are nonetheless described briefly below. The network with integral shop terminals, a central database, second terminals in connection with customs stations and third terminals at refund points are as described above in connection with FIGS. 1 and 3.

In accordance with the above-mentioned alternative system, the following occurs in a shop:
1. A tourist purchases 3 diamonds in shop 1 for 100 000 SEK and a pearl for 50 000 SEK. The VAT on the total purchase sum in shop 1 is 37 500 SEK.
2. The customer is identified as a tourist by the sales assistant or on the basis of his own information.
3. The purchase is registered in a shop terminal. This can occur before or after the person is identified as a tourist.
4. A refund receipt is printed by the terminal's inbuilt printer whereupon a reference to the current purchase in the form of a reference number is given on the receipt.
5. The sales assistant verifies electronically that a tax refund can be given on the purchase, the electronic cheque for which is linked to the present reference number.

Purchase details and a reference in the form of a reference number on the refund receipt are stored in the central database.

The degree of detail in the central database is decided by legal and contractual requirements. For example, the following purchase details can be stored in the database.

| Shop | Number | Item | Price | VAT | Reference number |
|------|--------|----------|---------|--------|------------------|
| 1 | 3 | Diamonds | 100 000 | 25 000 | 123456-8791212 |
| 1 | 1 | Pearls | 50 000 | 12 500 | 123456-8791212 |

At customs and refund points everything functions as described in connection with the first embodiment of the system in accordance with the invention apart from the fact that the tourist has a refund card, or information carrier, for each purchase occasion.

In the system as a whole, essentially the same simplifications and improvements as in the first embodiment are achieved in the alternative embodiment. The pace of the through-flow of customers increases at the same rate. The manual handling of receipts and forms reduces to the same degree for the shops. A disadvantage of the alternative system is of course that the customer must keep a refund receipt for each purchase. On the other hand, shops do not need to keep reusable information carriers in the form of pre-manufactured refund cards in credit card format.

Another disadvantage of the alternative system with a refund receipt for each purchase is that the customer, in the absence of an information carrier in the form of a "reusable" card, does not immediately identify himself as a person who has the right to a tax refund and the retailer and/or customer must act in some way in order to register the purchase as a purchase with the right to a VAT refund. On the other hand, in this alternative system, the shops do not require to be equipped with special reading equipment for reading reference numbers given in plain text and/or given in electronic form, such as on a magnetic strip or in a chip.

The invention has been described above in connection with embodiments.

Figure 5:
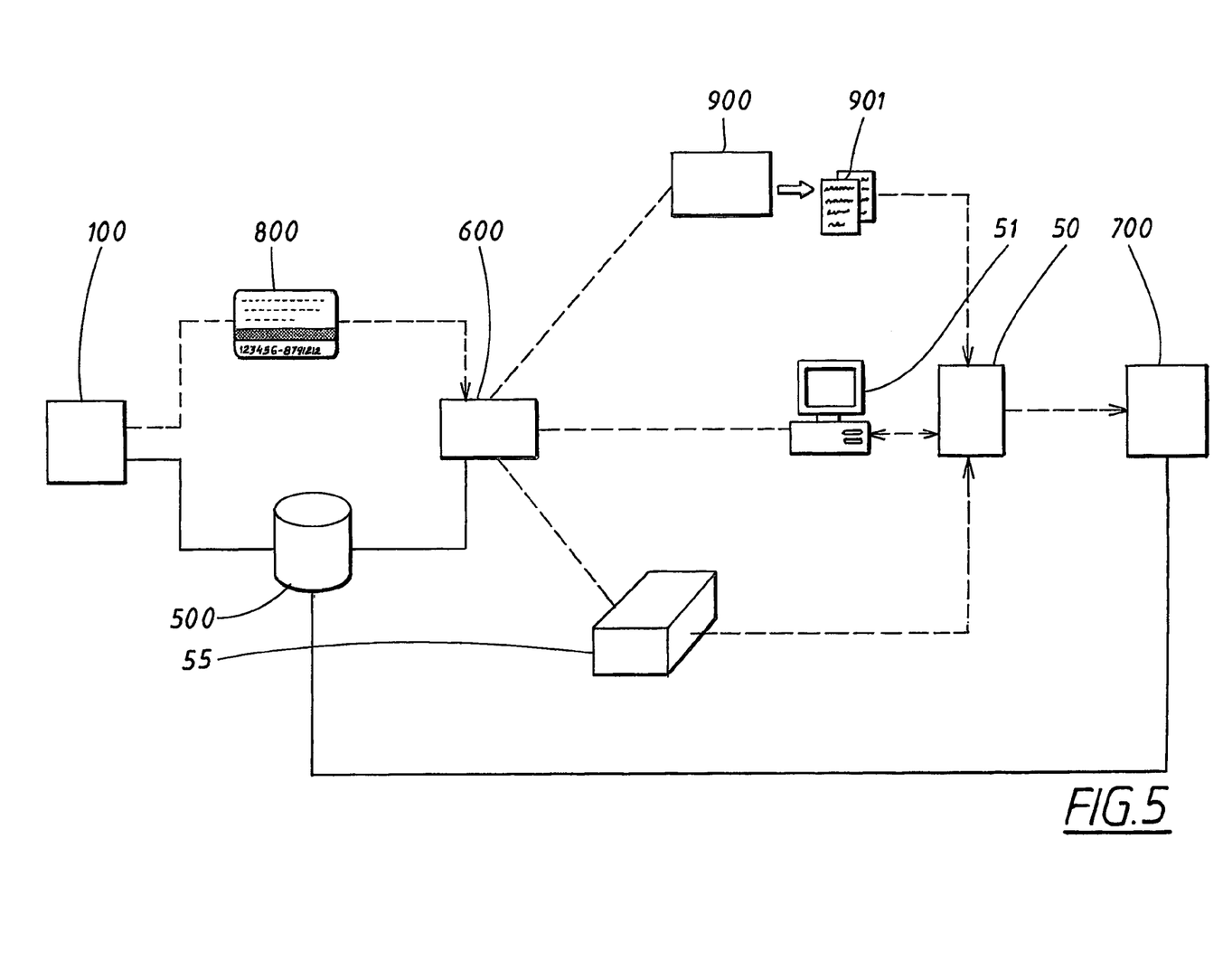
FIG. 5 shows an overview of a block diagram for the system in accordance with the invention.

FIG. 5 shows a simplified principal diagram of the system in accordance with the present invention.

Connected shops have been denoted with 100. Purchase data regarding a person's various purchases is separated in principle from the person and entered in the form of electronic cheques, one for each purchase, via shop terminals for storage in the central database 500 integral to the system.

The personal data required by the customs authority is separated from the purchase information and is given on an information carrier, for example a card 800. This card is carried by the customer, who fills in requisite information on the card directly in the shop or later.

Alternatively, cards can be furnished to foreign guests by hotels and the customer can himself or with the help of hotel staff fill in requisite details before visiting shops. The latter is of course only valid when the information carrier is constituted by a card intended for repeated use, i.e. for several purchases in different shops.

As has been described above in connection with the embodiments shown in FIGS. 1-4, the information carrier has a reference, which is also given on each electronic cheque that has been stored in the database in connection with the customer's purchases. Purchase data and personal data are thus separated and are not connected until the customer by means of the information carrier, here the card 800, enters the reference, here in the form of a reference number 120, in a second terminal 600. This, as can be seen from FIG. 5 is connected to the database 500 and is arranged to collect from the database any stored electronic cheques with reference numbers corresponding to the card.

Thus, in the second terminals 600 personal data is connected to electronic cheques belonging to the person. In or after the second terminals, purchase data and personal data are linked.

After the second terminal, the course of the customs procedure and the refunding of value-added tax can take different forms. The system is so flexible that it can be adapted for different countries to local requirements for customs handling and refunding of value-added tax. As will be seen below, the system as a whole can include manual handling of customs documentation in the form of paper documents for those countries that require it, full electronic handling also of the customs process, and customs treatment with inspection of goods in automatic machines by means of cameras.

If the customs authority requires customary paperwork, the second terminal can be connected to a printer 900 for printing out one or several forms 901, containing details of a customer's purchases and also personal details required for the customs inspection. Via the second terminal, a connection back to the database takes place with information that a form has been printed out corresponding to a certain electronic cheque. The system is provided with barriers so that the same form cannot be printed out several times. The customer brings the forms and goods to the customs station 50 where the customary inspection takes place and where purchases approved for refund of value-added tax are provided with a customs stamp. The customer can then go to a refund point 700 to claim payment of the refund. This refund point has third terminals, which are connected to the central database 500. Information regarding payments which have been carried out can be registered in the database if it is connected to the third terminal.

Of course, the customer does not require to visit the refund point in person but can send in the required documents, whereafter the money can be paid out. If, for example, the refund points are at an airport, they may be closed. Alternatively, the customer does not have time to go there or perhaps cannot find the refund point or forgets to claim his refund.

If the customs authority permits full electronic handling, the customs station is connected to the second terminal and thus to the database. The customs station is equipped with equipment for reading a person's information carrier and has a connected monitor, which in FIG. 5 has been shown schematically and denoted with 51. The system is arranged in such a way that a customs officer receives information from the database regarding purchases with the same reference as an information carrier inserted via the reading equipment. According to a suitable embodiment, purchase information for the person's purchases and the information carrier with requisite personal data given in plain text are presented on the monitor. The information can be verified and approved purchases can be marked as approved with electronic customs stamps. The verification that the transactions are approved for payment or that payment is not approved is stored in the central database.

In connection with the presentation of purchase data and personal data on the monitor, a goods check and passport check are carried out.

FIG. 5 also shows schematically an alternative where the second terminals are constituted by automatic machines 55. These are connected to the database and are arranged to link the customer's personal data with the corresponding electronic cheques when the customer inserts the information carrier in the automatic machine.

The automatic machines are provided with a camera (not shown) in front of which the customer can place purchased goods and his passport or other document which is to undergo customs inspection. In a customs station 50, customs officials can, via a fourth terminal (not shown), which is connected to the second terminal and the database, read information carriers and electronic cheques and, via said camera, compare presented goods with cheques collected from the database. Thereafter, approved cheques or approved individual items on cheques can be provided with electronic customs stamps. The verifications in the form of electronic customs stamps on approved cheques are stored in the database.

Said automatic machines can be arranged to pay out refunds of sales tax when the information carriers are inserted again.

Refunds of value-added tax can be carried out in different ways depending on the possibilities available at airports and in connection with customs stations and also depending on the wishes of the customer.

1. Refunds can take place in said automatic machines 55.
2. Refunds can take place at manned refund points, which can be located in connection with customs inspection points or at other suitable places where passengers pass by.
3. Refunds can take place in special automatic machines, which are intended solely for repayment.
4. The customer can also send the information carrier via post to the service company which administers the refunding, whereupon the service company deals with the refund in the desired manner. If the customs verification has been carried out by means of paper documentation, the requisite customs-stamped documents shall be sent together with the information carrier.

The invention is not limited to the embodiments described above, a number of variations being possible within the framework of the subsequent claims.

Security against fraud increases due to the fact that the purchase information is stored separately in a central database. In order to receive a tax refund it is not sufficient to have a forged refund form as this will be checked against details in the database.

In addition, further security against fraud is obtained by means of the establishment of a reference linked to personal data on an information carrier, for example in the form of a card with a reference number, which reference is linked to one or several electronic cheques.

In the above description, reference has been made in several embodiments to information carriers intended for use for several purchases in different shops. However, all of the embodiments can be applied to information carriers in the form of refund receipts for individual purchases and where said receipts are printed out in the first terminals on standard paper.

The invention is not limited to the physical form of the information carrier. For example, the information carrier can be constituted by a piece of a sheet of paper in any size, suitably in standard format, such as an A4 or A5-sheet.

The invention claimed is:

1. A system for facilitating a tax refund to a consumer for a set of purchases, the system comprising a central database, wherein the system is configured to:
   receive, at the central database via a network, purchase information from a first set of terminals remote to the central database, wherein the purchase information includes purchase details regarding the set of purchases by the consumer, wherein the purchase information includes an information carrier reference located on a portable information carrier;
   store, in the central database, electronic records for the set of purchases, wherein the electronic records include the purchase details and the information carrier reference;
   receive, at the central database via the network, a purchase information retrieval request from a second terminal distinct from the first set of terminals, wherein the purchase information retrieval request includes the information carrier reference;
   responsive to the purchase information retrieval request, retrieve all electronic records from the central database that are associated with the information carrier reference;
   provide a response from the central database to the second terminal via the network, wherein the response is based on the retrieved electronic records and indicates the set of purchases made by the consumer, and wherein the response facilitates a determination whether payment of the tax refund to the consumer is approved;
   receive, at the central database via the network, the determination whether payment of the tax refund to the consumer is approved;
   store the determination in the central database;
   receive, at the central database via the network, a request for the tax refund from a refund point;
   based upon the stored determination indicating that the payment of the tax refund has been approved, send an authorization to pay the tax refund to the consumer; and
   store, in central database, an indication that payment of the tax refund has been authorized.

2. The system of claim 1, wherein the portable information carrier comprises a card.

3. The system of claim 1, wherein the information carrier reference comprises a serial number.

4. The system of claim 3, wherein the information carrier reference further comprises a code.

5. The system of claim 1, wherein the information carrier reference comprises at least one identification number and a serial number.

6. The system of claim 1, wherein the information carrier reference comprises a unique code stored in the central database.

7. The system of claim 1, wherein the information carrier reference is encrypted.

8. The system of claim 1, wherein the information carrier reference comprises a random number.

9. The system of claim 1, wherein the purchase information includes a code that is stored separately from the portable information carrier.

10. The system of claim 1, wherein the second terminal is operable to read personal data from the portable information carrier.

11. The system of claim 1, wherein the system is configured to retrieve any stored electronic records associated with the information carrier reference from the central database and to present personal data of the consumer together with the retrieved records on a monitor of the second terminal, and to store approved purchase data in the central database following customs inspection.

12. The system of claim 11, wherein the system is configured to store a correlated data set of approved purchase data including electronic customs stamps following customs inspection.

13. The system of claim 1, wherein the first terminal comprises reference reading equipment configured to read the information carrier reference from the portable information carrier.

14. The system of claim 1, wherein the first terminal is configured to output a receipt comprising a statement regarding the total sales tax on each purchase.

15. The system of claim 1, wherein the portable information carrier comprises a refund voucher for purchases made on one purchase occasion, the first terminal being operable to print out the refund voucher, the information carrier reference being stated on the refund voucher and stored in the central database linked to the electronic record for said purchase on one purchase occasion, the refund vouchers having areas for writing personal data of the consumer.

16. The system of claim 1, wherein the portable information carrier comprises a card provided with a magnetic strip on which at least the reference is stored, at least one of the first or second terminals comprising a magnetic strip reader for reading information from the card.

17. The system of claim 1, wherein the information carrier carries the information carrier reference in visible text, at least one of the first or second terminals comprising at least one of optical reading or manual data entry equipment which enables information to be read and transferred from the portable information carrier to the first or second terminal.

18. The system of claim 1, wherein the information carrier reference is provided on the information carrier in the form of a bar code, at least one of the first or second terminals comprising a bar code reader.

19. The system of claim 1, wherein the portable information carrier comprises a card having the information carrier reference stored in a chip in the card, at least one of the terminals comprising a chip reader.

20. The system of claim 1, wherein the information carrier comprises a card in credit card format, the first terminal being configured for electronic transfer of personal data to a magnetic strip or a chip on the card.

21. The system of claim 1, wherein the second terminal comprises an automatic machine connected to the central database and configured to link personal data to corresponding electronic records in response to insertion of the portable information carrier into the automatic machine.

22. The system of claim 21, wherein the automatic machine comprises a camera, in front of which purchased goods and documents to be checked by customs can be placed, and wherein the system comprises a further terminal at which customs officers can read portable information carriers and electronic records and, via said camera, compare presented goods with electronic records received from the central database, the further terminal being configured to provide approved records with electronic customs stamps in the form of electronic signatures, the system being further configured to store in the central database verification in the form of electronic customs stamps that the records are approved for refund of sales tax.

23. The system of claim 1, wherein the second terminal is connected to printing equipment to print a form containing details of the consumer's current purchases and personal information for customs inspection to be provided with a customs stamp at customs for the verification of the export of purchased goods, the system being further configured to store in the central database information regarding which electronic records and information carriers have been linked in order to print out the form, and to prevent printing out of identical forms with identical purchase data.

24. The system of claim 1, wherein the portable information carrier has stored thereon personal details for the consumer.

25. The system of claim 1, wherein the first set of terminals are merchant terminals, and the second terminal is a customs terminal.

26. The system of claim 1, wherein the tax refund is of a value-added tax.

27. The system of claim 1, wherein the refund point is a third terminal distinct from the first set of terminals and the second terminal.

28. The system of claim 25, wherein the purchase details stored in the central database do not include personal details of the consumer, and wherein the purchase details and the personal details of the consumer are linked at the second terminal.

29. A method comprising:
receiving, at a central database via a network, purchase information from a merchant terminal, wherein the purchase information includes purchase details regarding a purchase by a consumer, wherein the purchase information includes an information carrier reference located on a portable information carrier of the consumer, wherein the information carrier reference is specific to the consumer;
storing, in the central database, an electronic record for the purchase that includes the information carrier reference;
receiving, at the central database via the network, a request from a customs terminal to retrieve all electronic records associated with the information carrier reference;
responsive to the request from the customs terminal, retrieving all electronic records stored in the central database with the same information carrier reference transmitted to the central database by the customs terminal in the request, the retrieved electronic records indicating a set of purchases by the consumer;
providing the retrieved electronic records to the customs terminal to facilitate a determination whether payment of a tax refund on the set of purchases is approved;
receiving, at the central database via the network, the determination whether payment of the tax refund is approved;
storing the determination in the central database;
receiving, at the central database via the network, a request for the tax refund from a refund terminal distinct from the customs terminal;
based upon the stored determination indicating that the payment of the tax refund has been approved, sending an authorization to pay the tax refund to the consumer; and
storing, in central database, an indication that payment of the tax refund to the consumer has been authorized.

30. The method of claim 29, wherein the portable information carrier comprises a card in credit card format.

31. The method of claim 29, wherein the information carrier reference comprises a reference number.

32. The method of claim 31, wherein the reference number is comprises a unique code stored in a database.

33. The method of claim 31, further comprising storing the reference number by means of a bar code and in plain text, at least one of the terminals being provided with a bar code reader.

34. The method of claim 31, further comprising storing the reference number on a magnetic strip on the information carrier and in plain text, at least one of the terminals being provided with a magnetic strip reader.

35. The method of claim 31, further comprising storing the reference number on a chip on the information carrier and in plain text, at least one of the terminals being provided with a chip reader.

36. The method of claim 31, wherein at least one of the terminals comprises equipment for manually entering the reference number stated in plain text.

37. The method of claim 29, wherein the information carrier reference further comprises a code.

38. The method of claim 37, wherein the code comprises an encryption.

39. The method of claim 29, wherein the portable information carrier has personal data stored on at least one of a magnetic strip or a chip on the information carrier.

40. The method of claim 39, wherein the merchant terminal performs electronic transfer of personal data to at least one of a magnetic strip or a chip on the portable information carrier.

41. The method of claim 29, wherein the merchant terminal receives personal data stored on the portable information carrier.

42. The method of claim 29, wherein the customs terminal is an automatic machine connected to the central database, the method further comprising linking personal data of the consumer to electronic records in response to insertion of the portable information carrier into the automatic machine.

43. The method of claim 42, wherein the automatic machine has a camera, the method further comprising:
  using the camera to create images of purchased goods placed in front of the camera;
  displaying the images to customs officers to be compared to information from portable information carriers and electronic records from the central database; and
  storing in the central database verification in the form of electronic customs stamps that the records are approved for refund of sales tax.

44. The method of claim 42, wherein the customs terminals are operable to link an information carrier reference to corresponding electronic records stored in the central database, wherein the customs terminals are connected to printing equipment, the method further comprising:
  printing at least one form containing details of a purchase and personal information to be provided with a customs stamp at customs for verification of the export of the purchase; and
  storing in the central database information regarding electronic records and information carriers that are linked to print forms.

45. The method of claim 29, wherein the portable information carrier stores personal details for the consumer.

46. A non-transitory computer-readable medium having stored thereon program instructions that are executable by a computer system to:
  receive, at a central database, information from a merchant terminal indicating purchase details of a purchase made by a consumer, wherein the information includes an identifier located on a portable information carrier of the consumer, wherein the identifier is specific to the consumer;
  store, in the central database, an electronic record for the purchase, wherein the electronic record includes the identifier;
  receive, at the central database, a request from a customs terminal to retrieve all electronic records associated with the identifier;
  responsive to the request from the customs terminal, retrieve all electronic records in the central database that are associated with the identifier transmitted to the central database by the customs terminal in the request, wherein the retrieved electronic records indicate a set of purchases by the consumer;
  transmit the retrieved electronic records to the customs terminal;
  receive, at the central database from the customs terminal, a determination whether payment of a tax refund to the consumer is approved;
  store the determination in the central database;
  receive, at the central database, a request for the tax refund from a refund terminal;
  based upon the stored determination indicating that the payment of the tax refund has been approved, send an authorization to pay the tax refund; and
  store, in central database, an indication that payment of the tax refund to the consumer has been authorized.

47. The non-transitory computer-readable medium of claim 46, wherein the identifier is unique to the consumer.

48. The non-transitory computer-readable medium of claim 46, wherein the electronic records that include the identifier do not include personal details of the consumer.

49. The non-transitory computer-readable medium of claim 46, wherein the program instructions executable to send the authorization to pay the tax refund are executable to send the authorization to the refund terminal.

50. The non-transitory computer-readable medium of claim 46, wherein the program instructions are executable to store a correlated data set of approved purchase data including electronic customs stamps following customs inspection.

51. The non-transitory computer-readable medium of claim 46, wherein the merchant terminal, the customs terminal, and the refund terminal are all connected via a network, and wherein the tax refund is of a value-added tax.

* * * * *